United States Patent Office 3,436,355
Patented Apr. 1, 1969

3,436,355
PROCESS FOR MAKING CAPSULES AND METHOD
OF MAKING PREMIX USED THEREIN
Joseph A. Bakan, Dayton, Ohio, assignor to The National
Cash Register Company, Dayton, Ohio, a corporation
of Maryland
No Drawing. Continuation of application Ser. No. 67,158,
Nov. 4, 1960. This application Apr. 18, 1966, Ser. No.
543,433
Int. Cl. B01j 13/02; A61k 3/07; C09g 3/00
U.S. Cl. 252—316
15 Claims

ABSTRACT OF THE DISCLOSURE

A process for making capsules in which a temperature gelable organic polymeric wall material, for example, gelatin, a liquid or solid water-immiscible nucleus material, for example, an oil, and a phase-separation inducing material, for example, a salt such as ammonium sulfate are dispersed in an aqueous vehicle below the liquefying temperature of the wall material. The temperature of the system is raised to a point at which the polymeric material becomes a liquid coacervate phase and the system is agitated to disperse in the aqueous vehicle the nucleus material as small bits and the coacervate phase as minute units which deposit on and wrap the small bits of the nucleus material. With agitation, the system is cooled below the gelling point of the wall material to form self-sustaining capsules which may be isolated or employed in the aqueuos vehicle.

---

This application is a continuation of copending application Ser. No. 67,158, filed Nov. 4, 1960, and now abandoned.

This invention is a process for making capsules, its capsule product, and an intermediate composition useful in making capsules.

The process is an improvement in that known process in which capsules are made by gelling a temperature-gelable polymer-rich liquid wall material previously deposited around individual water-immiscible nuclei when the nucleus material and the liquid wall material are in mobile dispersion in an aqueous vehicle at a temperature, higher than the gelling point, at which the gelable wall material is in liquid state.

In the known practice, the polymer wall material is caused to separate as a distinct liquid phase by a suitable change in the condition of an aqueuos sol of hydrophilic film-forming polymeric material, preferably gelatin or a gelatin-gum arabic complex, while the sol is at a temperature above the gelling temperature of the polymeric material; the change in condition being brought about typically by the addition of a salt or of a material causing a change in pH of the sol, the effect being to bring the system into a phase speration region where there is an increased interaction of the dissolved molecules of colloid polymeric material causing them to draw together and form a distinct polymer-rich liquid phase composed of polymer material and associated water.

Such a polymer-rich liquid, when dispersed in a liquid vehicle, has the property of depositing around individual particles of water-immiscible wettable material—e.g., oil droplets—dispersed in the same vehicle by agitation of the system, with the result of forming on each such nucleus an enclosing liquid polymer-rich wall which is converted to a protecting shell by being cooled to a temperature below the gelling temperature of the polymeric material thereby producing self-sustaining capsules.

In this known process, the nucleus material (hereinafter referred to as "bits," when dispersed as nuclei which may consist of one or more minute entities of liquid, solid, or mixed liquid and solid material) preferably is dispersed in the aqueous sol prior to the phase separation step, although it can be dispersed thereafter; and, when this nucleus material dispersion precedes the phase separation, the dispersion can be carried out either before or after or during the heating of the aqueous sol to the elevated temperature (e.g., thirty-five to fifty degrees centigrade) at which the phase separation is brought about and at which also the deposit of liquid polymer aruond individual nucleus bits occurs in the agitated and dispersed three-phase system of nuclei, polymer-rich liquid, and polymer-poor equilibrium liquid sol residue.

In the new process of the present invention, hydrophilic film-forming organic polymeric wall material, temperature gelable, is dispersed in particulate solid state in an aqueous vehicle at a temperature below the gelling temperature of that material. This temperature of dispersion preferably is room temperature. Optionally, but preferably, the water-immiscible wettable nucleus material, liquid or solid, or dispersion of solid in liquid, is dispersed in the same liquid vehicle; and this dispersal advantageously is simultaneous in whole or in part with that of the polymeric wall material. The nucleus material, when introduced, may be of the desired bit size, or it may be broken down to the desired bit size by the dispersion agitation.

In this low-temperature dispersal of the solid polymeric material in the aqueous vehicle, there is also introduced into and dispersed in the vehicle a phase-separation-inducing material, such, for example, as a salt, or an acid or an alkali, in an amount such as would cause a like system of water and polymeric material to be brought within the phase separation region as evidenced by the occurrence of a visible clouding of such system when at a temperature above the gelling temperature of the polymeric material. This clouding phenomenon, under that condition of temperature, for such a system having in it no dispersed nucleus material to obscure perception of the clouding, furnishes a criterion in some instances for the selection of the proportions of the polymeric material and the phase-separation-inducing material, and corresponds to the criterion used in the known process described above, in which the condition of the aqueous sol is changed to bring it within the phase separation region. If the separated polymer entities are fairly large, due to slow agitation, the phase separation may be seen only with the aid of a microscope.

In the practice of the present new process, the low-temperature dispersion of the polymeric material and the phase-separation-inducing material in the aqueous vehicle produces a system in which, if the nucleus material is also present in dispersion in the vehicle, no liquid deposit of polymer-rich material around nuclei takes place. However, when such a low-temperature dispersion of polymeric material and phase-separation-inducing material is brought to a temperature so that the polymer-rich phase flows freely, with dispersed nuclei present either by addition after the temperature rise or by reason of previous inclusion in the low-temperature dispersion, then the deposit of liquid polymer-rich wall-forming film around the individual nuclei occurs just as in the known process; and, when the wall material is gelled by natural cooling to room temperature or by use of artificial means, with agitation, self-sustaining capsules are similarly produced.

When the preformed dispersion is brought, with agitation, to a temperature above the temperature at which the polymer-rich phase flows freely, it seems clear that the same forces are at work as in the known process. There is prompt appearances of a dispersed polymer-rich liquid phase, the liquid units or droplets of which commence, at once, to deposit around individual dispersed nuclei; and there is a polymer-poor equilibrium phase. The behavior is the same as when in the known process the polymer-rich phase is produced as a separate phase from a previously homogeneous sol. In this specification, therefore, the material added in or with the polymeric material is spoken of as being a "phase-separation-inducing" material.

At the low temperature at which the dispersion of polymeric material and phase-separation-inducing material is formed, with or without nucleus material, the polymeric material does not dissolve but largely persists as a dispersed solid phase. It is referred to herein as "flocculated." Something akin to or possibly the same as the insolubilizing forces apparently governs its physical state, the system being, by reason of the presence of the phase-separation-inducing material, in what would be a phase separation region if the temperature were above the gelling temperature. The dispersion of polymeric material is therefore stable for a long period and is in condition, upon being heated to above the gelling temperature, to form at once a polymer-rich liquid phase capable of deposit around nuclei, without going through the stage of forming a homogeneous sol and of subsequent phase separation by coacervation, as in the known process.

Temperatures are referred to herein as "low" and "high" in relation to the flowability of the polymeric material in a particular system. That critical temperature is not a single value but is rather a relatively narrow range, somewhat different for each particular polymeric material or mixture of materials. Typical materials are distinctly and usefully "liquid" at temperatures varying, for different species, from approximately thirty degrees centigrade to approximately fifty-five degrees centigrade, and are distinctly and usefully "solid" at temperatures approximately fifteen degrees centigrade to twenty-five degrees centigrade or slightly higher. By being subsequently hardened, the gelled polymeric wall material will not disintegrate or melt at temperatures as high as one hundred degrees centigrade.

The merits of this new process, with its low-temperature dispersion of capsule-forming materials, are several. The system that is established at low temperature can be stored and shipped, permitting large-scale production of the premix. This is followed, whenever desired, by the use of all of it or of large or small aliquot portions either at the same site or at a different site for the final step of capsule production. That final step, requiring no such skilled proportioning as the premix requires, can be carried out by a simple heating and cooling, with agitation, when the nuclei are included in the premix; or by the addition of nucleus material in the alternative case, in which it is not present in the premix, the agitation that is necessary in either case serving to disperse the nucleus material in the manufacturing medium or vehicle.

If intermediate storage or shipment is not desired, the entire process can be carried out in a single vessel and a single aqueous vehicle, with the advantage of requiring no heating during the first stage, in which the dispersion is formed and the proper proportions are established. Heating is required only for the brief second stage, in which the deposit occurs around the nuclei, prior to the final cooling to gel the walls and produce the capsules.

In two useful modifications of this process, dry premixes can be prepared which will result in deposit of wall material around nuclei promptly upon being dispersed in an aqueous vehicle, with agitation, at a temperature above the liquefying temperature. Here again, the nucleus material either may be included in the premix or may be added as a part of the high-temperature stage of the operation. Such a dry premix may be prepared by mixing the polymeric material and the phase-separation inducing material, with or without the nucleus material, in dry particulate state, or in a friable agglomerated mixture capable of being broken up and dispersed in a liquid vehicle. Alternatively, it may be prepared from a liquid dispersion, such as that described above, by removal of the aqueous vehicle, leaving a mixture of the dispersed solids as a particulate residue. Any change in the pH of the remaining system caused by removal of the aqueous vehicle may be compensated for by the addition to the solids of pH-adjusting material to match that carried off in the water-removal step.

The new process generally, and the novel intermediate premix composition, liquid or dry, having thus been described, there will next be described the useful and the preferred classes of substances for the wall material, the phase-separation-inducing material, and the nucleus material, and the process procedures by several specific and quantitative examples, employing preferred materials, for the making of the capsules.

The wall material of the completed capsules must exist at room temperature in a self-sustaining state and preferably is a temperature-gelable hydrophilic film-forming polymeric material having a liquid polymer-rich phase gelling point in water substantially higher than normal room temperature. Gelatin from warm-blooded animals is eminently suited for this, as it fits the temperature requirements, is a first-class film-former, and forms a separate gelatin-rich liquid phase when induced to do so in warm water by the presence of a phase-separation-inducing material. Gelatin is an amphoteric polymeric material and in water may be suitably conditioned to assume a gelable liquid state by itself in the presence of certain salts or to form a complex with other polymeric materials natural or synthetic, which have a negative charge with respect to the gelatin below its iso-electric point, such as gum arabic, polyethylene maleic anhydride, polyvinylmethylether maleic anhydride, polymethacrylic acid, or combinations of them, in complexes with gelatin. Such complexes are formed in water when the gelatin assumes a liquid state by the gelation-water system's being warmed above the gelation point of the gelatin, when the pH of the water is adjusted to give the amphoteric gelatin a positive charge with respect to the negatively-charged polymer materials.

The nucleus material may be a liquid or a solid, different kinds of liquids in solution, different kinds of liquids in interspersion, or dispersions of solids in liquid, the only requirement being that the liquids or the solids be dispersable in water, which implies water-immiscibility in toto or in large part, as would be the case if several percent of the liquid or solid would saturate the water phase, leaving the rest immiscible therewith. Such, for instance, is the case with cassia oil, which, though slightly miscible with the water, can be encapsulated to the extent of the undissolved portion that is provided. Other water-immiscible liquids include vegetable, mineral, animal, and synthetic oils, such as corn oil, cottonseed oil, linseed oil, castor oil, peppermint oil, essential perfume oils from plants, lard oil, sperm oil, methyl salicylate, petroleum fractions, and trichlorodiphenyl, among many others too numerous to mention. There may be encapsulated water-immiscible solids, such as powdered magnetic iron oxide alone or suspended in an oil, pigments, pigmented oils such as inks, crystalline or amorphous powders such as dyes and medicines, and anything that is substantially water-immiscible and will be wet by the liquid polymeric wall material. Among specific examples of nucleus material are hexane, trichlorodiphenyl, pyromellitic anhydride, carvone, riboflavin, zinc sulfide, and barium sulfate. Almost universally, all solid bits of material that are immiscible with water are wettable by the liquid polymer wall material and will act as capsule nucleus material.

The water manufacturing vehicle may be modified in any manner as long as it is sufficient in volume to support the formation of a mobile dispersed liquid polymer-rich phase of the introduced polymeric wall-forming material plus the nucleus material, and as long as the modification elements do not prevent phase separation and are not reactive with the phase-separation-inducing material or the capsule materials. For instance, the water may be tinted with a water-soluble dye which will tint the capsule walls.

The invention in its broadest aspects, then, consists in gathering together all of the capsule-forming ingredients, or the major portion of them, in the proper ratio to produce capsules, in dry form or in an aqueous manufacturing medium, at room temperature, so that a pre-mix is provided that can be processed by heating and cooling, with agitation, to form self-sustaining capsules which may be hardened. Any ingredients missing from the premix composition, such as water or nucleus material, may be added by the final user of the premix, some time before the capsules are to be formed. In the case of the absence of water, the water must be added before the heating step. In the case of an absent nucleus material, it may be added before phase separation or after phase separation of the polymeric material but before cooling. Even an absent phase-separation-inducing material may be added either before or after the rest of the materials are brought to a temperature above the gelation point of the polymeric wall-forming materials.

It will be evident that the premix can be made by a person skilled in the art and stored in containers, thereafter being brought into effective use by one not familiar with the particular chemical processing art, because in the simplest case only heating (with addition of water if not present in the premix), agitation, and cooling are required to make capsules, which steps anyone, even the unskilled, can perform if given simple directions. Where any ingredient is missing from the premix, such as the nucleus material, which may be selected and introduced by the user, the process is still simple as compared with now-known processes for making individual capsules en masse without special and individual handling of each capsule.

The invention will next be described in detail, with a preferred and other embodiments specifically set out.

EXAMPLE I

In this example, which is the preferred process, a premix composition is made of water, a phase-separation-inducing material, and the intended polymeric wall material, which polymeric material is kept from dissolving completely but is maintained in a slightly hydrated form by the presence of the phase-separation-inducing material, and in which condition the said premix may be stored pending subsequent use. In the subsequent use, the aforesaid premix is heated to between thirty-five degree centigrade and fifty degrees centigrade with agitation to form a dispersed polymer-rich phase, the selected nucleus material is added either before or after heating, and the materials are thereafter kept agitated until liquid-walled capsules are formed, thereafter set to a self-sustaining condition by being cooled at least to room temperature (twenty degrees centigrade to twenty-five degrees centigrade), and hardened, if desired.

The specific proportions and kinds of materials which follow are not to be deemed limiting, as a choice of wall materials and nucleus materials, a number of which have been given, is possible.

The premix, in a small batch, may consist of 20 grams of pigskin gelatin having its iso-electric point at pH 8.9, 980 grams of water, 800 milliliters of a 20 percent, by weight, aqueous solution of ammonium sulfate, and, if desired, the nucleous material. The nucleous material taken as a convenient example is 200 milliliters of corn oil, which may be introduced into the room-temperature premix. Alternatively, the premix may not contain the oil nucleus material. If it does not contain the nucleus material, the subsequent ultimate processor user may supply it or any other nucleous material desired, either liquid or solid, or a combination thereof, before or after the heating step. Agitation will comminute liquid nucleus material. If solid nucleus material is used and is of a kind which will be comminuted by the agitation, it may be added in bulk; otherwise it is introduced into the system already comminuted.

If it is desired that the premix have the polymeric material present therein in finely-divided form for rapid solution on subsequent heating, the polymeric material first may be introduced into the water, which is heated to form an aqueous polymeric material precursor solution, which then is cooled to twenty-five degrees centigrade. Afterwards, with agitation, a phase-separation-inducing agent is added to cause a flocculent solid precipitate to form, having a particles size of the order of units to tens of microns. This, then, may itself constitute the storable premix composition to which nucleous material may be added. Specifically, to make such a precipitate, an aqueous solution of gelatin and gum arabic is made, at thirty-five to fifty degrees centigrade, of 880 grams of water, 10 grams of gelatin, of the kind before specified, and 10 grams of gum arabic, to which solution, after cooling to twenty-five degrees centigrade, is added, with agitation, enough of a 10 percent aqueous solution of acetic acid to bring the pH of the aqueous system to 4.5.

Either of the room-temperature premix storable systems may be heated and may be agitated with selected nucleous material furnished at the desired stage in an amount to equal 5 to 1,000 percent or more of the solids of the system, depending on the thickness of the capsular walls desired or required for the protective retainment of the nucleus material.

EXAMPLE II

In this example, a premix is made of 10 grams of acid-extracted gelatin and 10 grams of gum arabic, the gelatin being extracted from pigskins and the acidity of the gelatin, because of the method of extraction, being such that, when the dry mix is introduced into 880 grams of water and heated, with agitation, to thirty-five to fifty-five degrees centigrade, the pH of the system will be between 3 and 4, which is within the phase-separation range. The gelatin and the gum arabic will then form a complex liquid phase which is dispersed in the water, by the agitation, as minute polymer-rich liquid entities available for seeding onto nucleus bits and forming a liquid wall therearound which thereafter is gelled by natural cooling or artificial cooling below the gelling temperature of the deposited wall material. This forms self-sustaining capsules which may be recovered from the water and dried without heat.

If it is desired to render the capsules resistant to heat, so that they may be dried, in hot air or other hot medium, they must be hardened by some cross-linking agent such as formaldehyde or glutaraldehyde. If glutaraldehyde is used, it is introduced, with agitation, in an amount of 10 milliliters of a 25 percent aqueous solution, which, with stirring for a couple of hours, more or less, will harden the capsules to a degree depending on the length of treatment. The glutaraldehyde hardening can be carried on at room temperature, or below. If formaldehyde is used, 1.9 milliliters of a 37 percent aqueous solution is introduced into the system, after the liquid-walled capsules are formed, the pH being raised to 9 and the temperature reduced to ten degrees centigrade to prevent disintegration of the liquid wall. Other aldehydes and cross-linking agents may be used in place of those named.

Polyethylene maleic anhydride or polyvinylmethyl-ether maleic anhydride may be used in part or in whole as a substitute for gum arabic as a negative polymer, but in smaller concentrations, which may be varied greatly.

Here again in the utilization of the dry mix, the nucleus material already in the desired bit size may be present in the dry mix or introduced into the water system with the dry mix at any time before or after phase separation has occurred.

If the dry mix is to include polymeric wall-forming materials that do not bring about a phase separation pH condition when dispersed in the body of water that acts as a manufacturing medium, such premix can be modified by a substance to adjust that pH, such substance preferably being a solid, but, if a slight amount of liquid pH-adjusting material is introduced, the polymer material still will stay in a more or less semisolid state.

It is also within the scope of the species of premix of this Example II to have the nucleus material placed therein, whether liquid or solid, as, for instance, 20–160 grams of powdered magnetic iron oxide, depending on the selected bit size. The bit size and the amount of nucleus material used will determine the overall capsule size and wall thickness. If a liquid nucleus material is to be used, it may be introduced into the premix in approximately the same amounts as a corresponding solid nucleus material.

It will be apparent that the premix compositions, particularly from the standpoint of remaining inert to environmental conditions, such as temperature, occupy less space and can be converted to usable capsules by one unskilled in the art of compounding chemical compositions, by following a few simple instructions for the introduction of water and the heating and agitation, even if the ultimate user introduces his own nucleus material.

It is evident that the invention encompasses compositions containing but one polymeric wall-forming material which forms in heated agitated water as dispersed entities of a simple polymer-rich liquid phase, and also encompasses two or more polymeric materials which combine in the heated water to form dispersed entities of a complex polymer-rich liquid phase.

The storage of the premix may be in any kind of receptacle, open or closed, such as boxes or cans, as the occasion demands.

It is to be stressed that all of the necessary work in proportioning of the wall-forming materials is carried out in the compounding of the premix and is not left in the hands of the ultimate user, who may not be qualified in that respect.

It also is to be stressed that, in the use of such premixes, there is no necessity for the ultimate user to form sols, solutions, or emulsions prior to phase separation, the dispersions and the phase separation being automatically taken care of when water is added and heat and agitation are provided, as specified.

What is claimed is:

1. The process of making capsules en masse in a liquid manufacturing vehicle, each capsule consisting of an enclosing wall protectively wrapping up a bit of at least substantially water-immiscible nucleus material, the wall being of gelled gelable polymeric material, including the steps of placing an amount of temperature-gelable hydrophilic film-forming polymeric material and a phase-separation-inducing material therefor in a body for water at a temperature below the liquefying temperature of the polymeric material therein to form a system, said body of water being sufficient to dissolve the polymeric material when heated together; raising the temperature of said materials to where at least a portion of the polymeric material becomes a liquid coacervate phase as determined by the amount of phase-separation-inducing material used; agitating said materials to disperse the coacervate phase in the water as minute units; adding an amount of the at least substantially water-immiscible nucleus material sufficient to be wrapped by the coacervate phase, any time during the foregoing steps, whereby the agitation disperses the nucleus material as bits and whereby coacervate units deposit on and wrap the bits of nucleus material to form a liquid coacervate wall about each nucleus bit; and finally, still with agitation, cooling the water and the materials contained therein below the gelling point of the coacervate material deposited on the nucleus bits to form self-sustaining capsules that may be handled individually in or out of the body of water.

2. The process of claim 1 in which the nucleus material is added to the water before the polymeric material is added to the water.

3. The process of claim 1 in which the nucleus material is added to the water after the polymeric material has been added to the water.

4. The process of claim 1 in which the nucleus material is added before the temperature is raised.

5. The process of claim 1 in which the nucleus material is added after the temperature is raised.

6. The process of claim 1 in which a hardening step follows the gelling of the capsules.

7. The process of claim 1 in which a hardening step follows the gelling of the capsules, and thereafter the capsules are recovered as individually-handleable units from the water.

8. The process of claim 7 in which the nucleus material is added before the temperature is raised and in which the capsules, after the walls are hardened, are recovered from the water.

9. The process of claim 1 in which the nucleus material is added after the temperature is raised and in which the capsules are hardened and recovered from the water.

10. The process of claim 1 in which the nucleus material is a water-immiscible solid.

11. The process of claim 1 in which the nucleus material is a liquid.

12. The process of claim 1 in which the nucleus material is finely-divided solid material suspended in a liquid.

13. The process of claim 1 in which the cooling is brought about by transfer of the heat to the environment bringing the temperature of the capsules within the gelation range.

14. The process of claim 1 in which the cooling of the gelation range is brought about quickly by providing an environment for the capsules which is below room temperature.

15. The method of making a premix which can subsequently be heated, agitated, and cooled, with the introduction of bits of at least substantially water-immiscible nucleus materials before or after heating, to form capsules each consisting of a bit of at least substantially water-immiscible nucleus material protectively surrounded by a self-sustaining wall of hydrophilic film-forming temperature-gelable polymeric material, including the steps of making a solution of the polymeric material in warm water in an amount less than would cause a gel to form at room temperature, cooling to room temperature, and then with agitation introducing a material that would induce phase separation if the polymer were at the warmer temperature, such acting to precipitate a fine flocculent solid of the polymeric material, which flocculent polymeric material dispersion, when subsequently warmed, will readily form a polymer-rich liquid phase.

References Cited

UNITED STATES PATENTS 2,800,457 7/1957 Green et al. _____ 252—316
2,800,458 7/1957 Green _____ 252—316

RICHARD D. LOVERING, *Primary Examiner.*

U.S. Cl. X.R.

106—19, 132; 117—100; 167—83; 252—62.56; 264—4